(12) United States Patent
Wu et al.

(10) Patent No.: US 11,107,130 B1
(45) Date of Patent: Aug. 31, 2021

(54) CONTENT OFFERS BASED ON SOCIAL INFLUENCES

(71) Applicant: Google LLC, Mountain View, CA (US)

(72) Inventors: Ping Wu, Saratoga, CA (US); Jennifer W. Lin, San Jose, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 16/443,131

(22) Filed: Jun. 17, 2019

Related U.S. Application Data

(63) Continuation of application No. 13/298,238, filed on Nov. 16, 2011, now Pat. No. 10,366,421, which is a continuation-in-part of application No. 13/206,292, filed on Aug. 9, 2011, now abandoned.

(51) Int. Cl.
*G06Q 30/00* (2012.01)
*G06Q 30/02* (2012.01)

(52) U.S. Cl.
CPC ................ *G06Q 30/0271* (2013.01)

(58) Field of Classification Search
CPC ........... G06Q 30/0217; G06Q 30/0244; G06Q 30/0245; G06Q 30/0277
See application file for complete search history.

(56) References Cited

U.S. PATENT DOCUMENTS

| | | | |
|---|---|---|---|
| 5,918,014 A | 6/1999 | Robinson | |
| 7,197,470 B1 | 3/2007 | Arnett et al. | |
| 7,246,083 B2 | 7/2007 | Bibelnieks et al. | |
| 2007/0121843 A1 | 5/2007 | Atazky et al. | |
| 2007/0225996 A1 | 9/2007 | Haberman et al. | |
| 2009/0177588 A1 | 7/2009 | Marchese | |
| 2009/0217178 A1 | 8/2009 | Niyogi | |
| 2010/0145777 A1* | 6/2010 | Ghosh | G06Q 90/00 705/14.1 |
| 2010/0174607 A1 | 7/2010 | Henkin et al. | |
| 2010/0228614 A1* | 9/2010 | Zhang | G06Q 30/0249 705/14.16 |
| 2011/0231296 A1 | 9/2011 | Gross et al. | |
| 2012/0084127 A1 | 4/2012 | Nkrumah | |
| 2012/0254312 A1 | 10/2012 | Patel | |
| 2013/0018838 A1* | 1/2013 | Parnaby | G06Q 30/0203 706/52 |
| 2013/0019202 A1 | 1/2013 | Regan et al. | |
| 2013/0132158 A1 | 5/2013 | L'Huillier et al. | |
| 2013/0304585 A1 | 11/2013 | Atazky et al. | |

\* cited by examiner

*Primary Examiner* — Alvin L Brown
(74) *Attorney, Agent, or Firm* — Fish & Richardson P.C.

(57) ABSTRACT

Methods, systems, and apparatus, including computer programs encoded on a computer-readable storage medium, and including a method for providing content based on social influence scores of publishers. The method comprises identifying a social influence score for each of a plurality of users associated with a social network where one or more of the users is also a publisher of content. The method further comprises receiving a request for content, the content to be delivered along with content provided by a content publisher. The method further comprises determining a social influence score for the particular content publisher and identifying one or more offers associated with content, where each offer is based at least in part on a specification by a content sponsor of at least a minimum social influence score for a given impression. The method further comprises providing a content item based on the one or more identified offers.

20 Claims, 7 Drawing Sheets

CONTENT OFFERS BASED ON SOCIAL INFLUENCES

CROSS-REFERENCE TO RELATED APPLICATIONS

This application is a continuation application of, and claims priority to, U.S. patent application Ser. No. 13/298,238 entitled "CONTENT OFFERS BASED ON SOCIAL INFLUENCES," filed Nov. 16, 2011, which is a continuation-in-part and claims the benefit under 35 U.S.C. § 120 of U.S. patent application Ser. No. 13/206,292, now abandoned, entitled "CONTENT OFFERS BASED ON SOCIAL INFLUENCES," filed Aug. 9, 2011.

The disclosure of each of the foregoing applications is incorporated herein by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through prices offered by content sponsors as part of a reservation system, or by bid amounts used in an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content based on social influence scores of publishers. The method comprises identifying a social influence score for each of a plurality of users associated with a social network where one or more of the users is also a publisher of content. The method further comprises receiving a request for content, the content to be delivered along with content provided by a content publisher. The method further comprises determining a social influence score for the particular content publisher. The method further comprises identifying one or more offers associated with content, where each offer is based at least in part on a specification by a content sponsor of at least a minimum social influence score for a given impression, where the offers enable the content sponsors to target one or more users who will view the content published by the content publisher based at least in part on the content publisher's social influence in a social network. The method further comprises providing a content item based at least in part on the one or more identified offers.

These and other implementations can each optionally include one or more of the following features. The method can further comprise conducting an auction using the one or more offers associated with the content sponsors that specified a minimum social influence score, where providing the content item is based at least in part on the auction. The request for content can be a request for content to be delivered in the social network. The request for content can be a request for content to be delivered outside the social network. The social influence score can be measured in terms of one or more social signals that relate to categories of user activity of the user in the social network. Each of the one or more social signals can correspond to one or more buckets, and offers associated with the content sponsors further designate one or more particular buckets as being attributable to a content publisher for receipt of an impression of content from the content sponsor. Each offer can further be based on one or more particular social networks specified by the content sponsor, and providing the content can be limited to providing the content item on the specified one or more particular social networks. The categories of user activity can be based on metrics for social conditions and actions selected from the group comprising: friends, followers, social graphs, high-social-influence groups, friend requests, photo associations, video associations, cross-user commenting, birthday greetings, viewings, referrals, user-name searches, re-publishings and unspamminess. The offer can be associated with a reservation, the bid representing a price the content sponsor is willing to pay for impressions along with content publisher content where the content publishers have a social influence score above the minimum. The request can be a request for ad content to be included in a content publisher's webpage. The request can be a request for ad content to be included in a content publisher's blog. The request can be a request for ad content to be included along with publisher content that has been requested by a user.

In general, another innovative aspect of the subject matter described in this specification can be implemented in methods that include a method for providing offers for targeting content items based on social influence scores of publishers. The method comprises presenting a user interface to a content sponsor for designating targeting criteria for targeting content to be presented to users, the user interface including a selection option for designating a minimum or target social influence score of a content publisher in a social network that is to receive an impression of content from the content sponsor. The method further comprises receiving an offer from the content sponsor including an offer amount and a specification of a minimum social influence score of the target content publisher that is to be eligible to receive content from the content sponsor. The method further comprises providing the offer for storage, where the offer is used for selecting content items for an impression of content on a user device of a user where the impression occurs along with content provided by the content publisher that has the minimum social influence score.

These and other implementations can each optionally include one or more of the following features. The social influence score can be measured in terms of one or more social signals that relate to categories of user activity of the user in the social network. The social influence score can be defined in terms of one or more buckets, and receiving the offer from the content sponsor can include identification by the content sponsor of one or more buckets as being attributable to a content publisher for receipt of an impression of content from the content sponsor. The content sponsor can further specify one or more particular social networks for which the content is to be provided.

In general, another innovative aspect of the subject matter described in this specification can be implemented in methods that include a method for targeting content based on the content publisher's social influence. The method comprises receiving a request for content from a user, the user being a participant in a social network, the request being associated with a content request for receipt of content from a content publisher. The method further comprises determining an influence score associated with the content publisher in the social network. The method further comprises targeting content to the user based at least in part on the content publisher's influence score in the social network, where targeting includes enabling content sponsors to bid on impressions of content to users requesting content from content publishers that satisfy a predetermined influence score criteria.

In general, another innovative aspect of the subject matter described in this specification can be implemented in methods that include a method for using an auction for providing content based on social influence scores of content publishers. The method comprises receiving a request for content from a user in a social network, the request for delivering one or more content items along with content presented by a content publisher. The method further comprises determining an influence score associated with the content publisher. The method further comprises conducting an auction based on bids received from content sponsors including bids identifying a minimum influence score for a targeted content publisher to be eligible to be presented content by a respective content sponsor. The method further comprises identifying one or more winning bids and providing one or more content items to the user based at least in part on auction results and the content publisher's influence score.

In general, another innovative aspect of the subject matter described in this specification can be implemented in systems that include a content management system that provides content items responsive to received requests. The content management system includes a social influence engine enabled to determine social influence scores for publishers of content. The content management system further includes a content sponsor engine enabled to allow a content sponsor to target content to one or more users that subscribe to or otherwise receive content from the publishers, where the targeting is based at least in part on the social influence scores. The content management system includes a request handler enabled to receive a request for content from a user, identify one or more offers associated with content sponsors that include a specification of at least a determined social influence score for a given impression, and provide a content item responsive to the request and the at least one or more offers.

In general, another innovative aspect of the subject matter described in this specification can be implemented in computer program products that include a computer program product tangibly embodied in a computer-readable storage device and comprising instructions that, when executed by a processor, cause the processor to: identify a social influence score for each of a plurality of users associated with a social network where one or more of the users is also a publisher of content; receive a request for content, the content to be delivered along with content provided by a content publisher; determine a social influence score for the particular content publisher; identify one or more offers associated with content, where each offer is based at least in part on a specification by a content sponsor of at least a minimum social influence score for a given impression, where the offers enable the content sponsors to target one or more users who will view the content published by the content publisher based at least in part on the content publisher's social influence in a social network; and provide a content item based at least in part on the one or more identified offers.

These and other implementations can each optionally include one or more of the following features. The computer program product can further comprise instructions to conduct an auction using the one or more offers associated with the content sponsors that specified a minimum social influence score, where providing the content item is based at least in part on the auction.

In general, another innovative aspect of the subject matter described in this specification can be implemented in computer program products that include a computer program product tangibly embodied in a computer-readable storage device and comprising instructions that, when executed by a processor, cause the processor to: present a user interface to a content sponsor for designating targeting criteria for targeting content to be presented to users, the user interface including a selection option for designating a minimum or target social influence score of a content publisher in a social network that is to receive an impression of content from the content sponsor; receive an offer from the content sponsor including an offer amount and a specification of a minimum social influence score of the target content publisher that is to be eligible to receive content from the content sponsor; and provide the offer for storage, where the offer is used for selecting content items for an impression of content on a user device of a user where the impression occurs along with content provided by the content publisher that has the minimum social influence score.

Particular implementations may realize none, one or more of the following advantages. For example, content sponsors may be willing to bid higher for impressions of their content if the content sponsors have control over the types of users who are targeted, including users who are targeted using information related to social influence scores.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
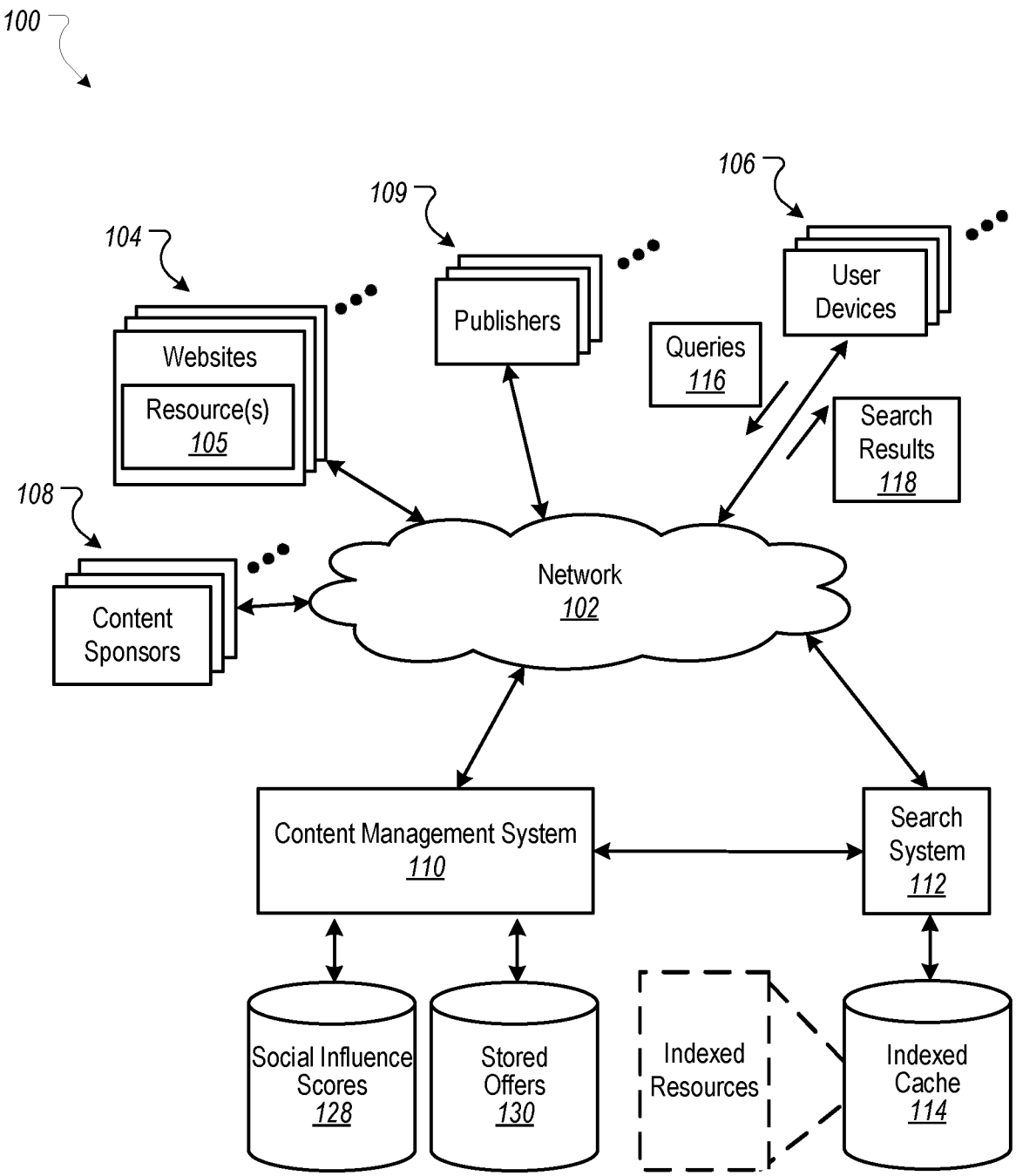
FIG. 1 is a block diagram of an example environment for delivering content.

This document describes methods, processes and systems for targeting and delivering content based on social influence scores associated with users who are members of social networks and who are also content publishers (e.g., using their personal web pages or their pages on social networking web sites). As an example, social influence scores for users can be computed based on various metrics that measure one or more social signals that relate to categories of user activity in the social network. Example metrics can relate to the number of friends that a user has, the actions that the user or the user's friends have performed in social networks, and so on. Content sponsors, for example, can target content to users based on computed social influence scores, including specifying targeting conditions that depend on computed social influence scores of users who are also content publishers. For example, a content sponsor C can submit offers (e.g., bids for use in an auction or an offer that is part of a reservation, hereinafter collectively referred to as an "offer") for subsequent impressions of a content item I (e.g., an advertisement) to users. The offers can depend, for example, on a minimum social influence score S of a content publisher P who publishes content with which the content item I can be presented. Other predetermined influence score criteria for the user in the social network can be used. Consequently, when content is requested for a particular user U (e.g., to fill an ad slot on a content publisher's web page), the content publisher's social influence score can be looked up or determined, and corresponding offers for content can be identified (e.g., from offers made by the content sponsor C and other content sponsors). For example, if the content publisher P has a social influence score of S or greater, then the bid for content item I can be identified. As a result, the content item I associated with the content sponsor C can be provided in response to the request for content.

In some implementations, social influence scores can be measured in terms of one or more social signals that relate to categories of users and/or categories of user actions. For example, a user can be assigned a higher social influence score if the user has a large number of friends in the social network, or the user is tagged relatively often with photos or videos by other users, and so on. In some implementations, a content sponsor can specify particular social networks for which users are to be targeted and for which the content sponsor's content is to be provided. For example, some content sponsors may want to limit their advertising campaigns to certain social networking web sites, to specific types of users within those groups, or to content associated with content publishers who have a social influence score that exceeds a specified minimum social influence score.

In some implementations, social influence scores can be used and/or associated with content of different types that are the property of or are controlled by a social network user (e.g., User A) who is also a content publisher. Example different types of content property for the social network user can include: a) web pages owned by User A; b) social network pages (e.g., wall pages, profile pages) owned by User A; c) photos and/or photo properties associated with User A; and d) videos posted by User A (e.g., on a video sharing web site and where User A has high influence score on the social network).

In some implementations, one or more aggregation functions can be used to combine all the social signals together for a particular user who is also a content publisher. In some implementations, for each signal, a score can be computed for each user in the network, and the score can be normalized by comparing the score to the highest and lowest scores according to that signal. In some implementations, percentiles can be used. For example, in terms of followers (or some other social signal), User A can be in the $80^{th}$ percentile, e.g., meaning that user A in the top 20%. In some implementations, linear function can be used to combine scores by percentiles.

FIG. 1 is a block diagram of an example environment 100 for delivering content based on social influence scores. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), content publishers 109, and the content management system 110. The example environment 100 may include many thousands of websites 104, user devices 106, content sponsors 108 and content publishers 109.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104. For example, content publishers can include publishers who are also users on a social network, where the publication is a web page or resource associated with the user.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation) and information related to social influence scores.

When a resource 105, search results 118 and/or other content are requested by a user device 106, the content management system 110 receives a request for content. The request for content can include characteristics of the slots that are defined for the requested resource or search results page, and can be provided to the content management system 110. For example the request can identify the publisher of the content, e.g., the publisher of the content on the social network from which a publisher influence score can be determined.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In the instant case, eligible content items can be content items that are associated with bids that have been made for presentation on publisher sites where the user associated with the publication has an influence score above a predetermined threshold.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by serving content that is more likely to be of interest to the user. For example, content items (e.g., ads) that are served can be selected in part based on a social influence score of the content publisher, which can also be an indication of how likely the user is to react positively to a content item, e.g., leading to a conversion.

In some implementations, the environment 100 can include plural data stores that include information regarding social influence scores and offers for serving content based on the social influence scores. For example, the content management system 110 can use a data store of social influence scores 128 (e.g., that contains calculated social influence scores for each of the users and content publishers associated with one or more social networks) and a data store of stored offers 130 (e.g., that contains offers provided by the content sponsors 108 for content items to be selected based on the social influence scores). In some implementations, social influence scores can be measured in terms of one or more social signals that relate to categories of user activity of the user in the social network, e.g., categories include corresponding metrics associated with the user that measure social actions or conditions associated with the user.

The social influence scores 128, for example, can include social influence scores that are computed on a scheduled basis (e.g., daily, weekly, etc.) or as needed. In some implementations, the social influence scores 128 can logically include social influence scores that are computed in real time, such as if a social influence score for a particular user has not yet been computed or is outdated (e.g., older than a threshold period of time). In some implementations, social influence scores can be computed from social metrics associated with a user, such as metrics related to a user's actions or activity on the social network (e.g., postings by the user), or a social prominence associated with the user based on the actions of other users.

Example social metrics can include the number of followers (and/or the number or friends) that the user has on the social network. In some implementations, considering other users as followers and/or friends can be limited to users who have social influence scores above a pre-determined percentile threshold (e.g., 50%). In some implementations, an algorithm can be run on a social graph that includes the user (and the user's associated friends, their associations, and so on) in order to determine a stationary distribution of the user's weight as a node in the social graph. For example, analyzing the user's social graph can be a better indication of the user's social prominence than simply using counts of the user's friends and followers because more weight can be applied to users whose friends are also high influencers. As a result, this type of metric can be more immune to spammy social links. In some implementations, social metrics can be based on the number of high-social-influence groups that the user is in. For example, high-social-influence groups can include groups that have more than a threshold number of members (e.g., more than a thousand members) or more than a threshold number of high social influence score individuals.

Other example social metrics can be based on actions performed on the social network, such as friend requests (e.g., the number of times that the user was requested to add another user as friend), photo associations (e.g., the number of times that the user has been tagged in a photo), video associations (e.g., the number of times that the user has been tagged in a video), cross-user commenting (e.g., the number of times that the user has had their status commented upon by other users), birthday greetings (e.g., the number of times that the user is wished "happy birthday" on the user's birthday), viewings (e.g., the number of times that the user's profile has been visited), referrals (e.g., the number of times that the user's profile has been visited with a referral from a search engine with user's name as the keyword), username searches (e.g., the number of times that the user's name has been searched within the social network site), re-publishings (e.g., the number of times that the user's links, photos, videos, or other posted content has been shared, liked, commented upon, etc.), or unspamminess (e.g., the number of times that the user was sent a non-spam message using chatting, wall posts, email, etc.). Other action-based metrics can be used.

For situations in which the systems discussed here collect personal information about users, the users may be provided with an opportunity to opt in/out of programs or features that may collect personal information (e.g., information about a user's social network, social actions or activities, a user's preferences, or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined. In some implementations, opt out features related to social networking systems, for example, can allow the user to specify that the user's activity stream content is not to be used in ads, or to anonymize the information in some way.

Figure 2A:
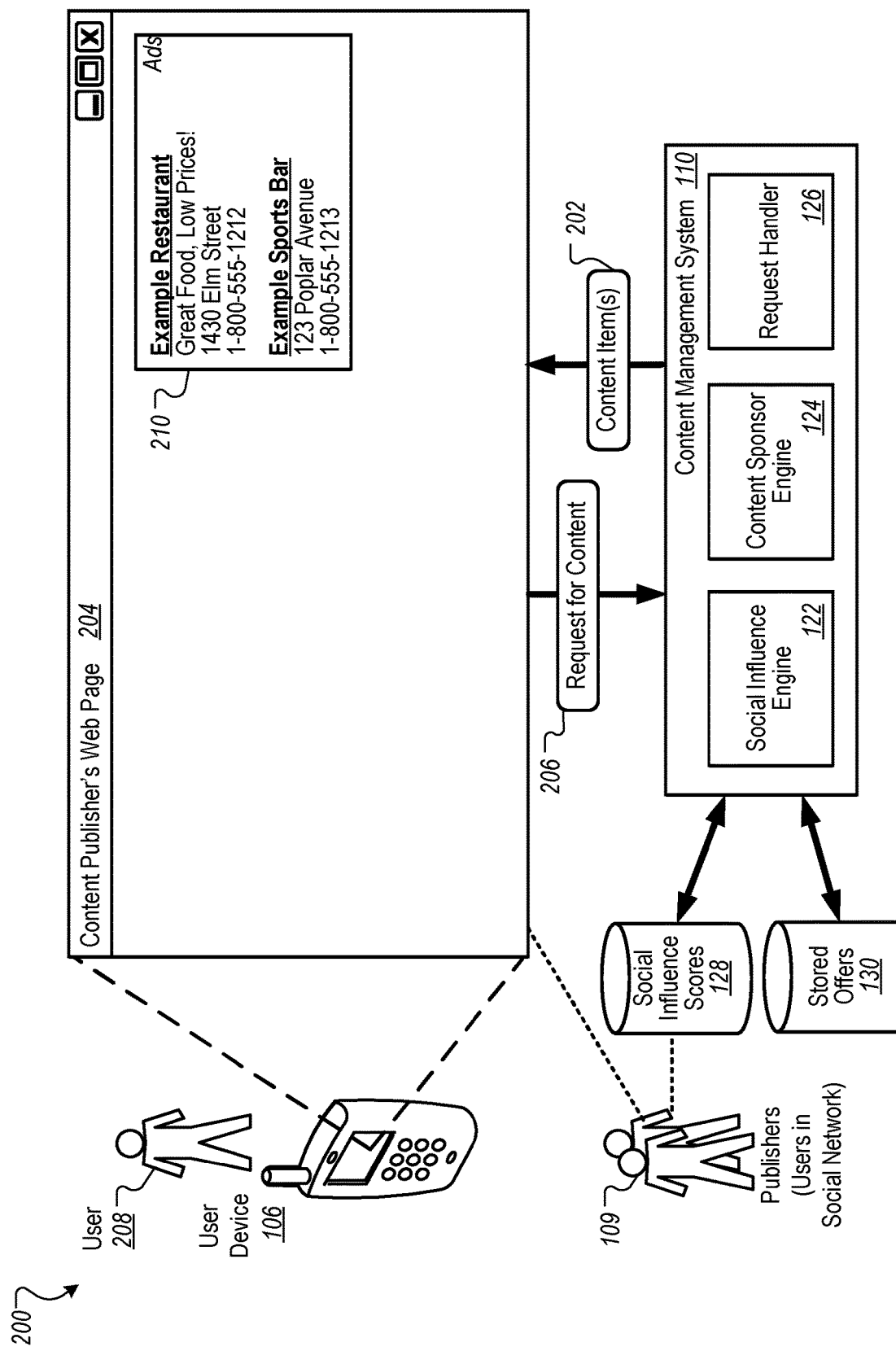
FIG. 2A is a block diagram of an example system for delivering content based on social influence scores of publishers.

FIG. 2A is a block diagram showing an example system 200 for delivering content based on social influence scores of content publishers 109. The system 200 includes the social influence scores 128 and the stored offers 130 that the content management system 110 can use, for example, to provide content items 202 for display on a content publisher's web page 204. The selection of the content items 202 can be based, for example, on offers from the stored offers 130 and in response to a request for content 206 that can originate from a user 208. For example, the request for content 206 can be a request to fill a content item slot 210 on the web page 204 of a content publisher 109 that is published outside of the social network, e.g., on a personal web page. In another example, the content item slot 210 can be on the content publisher's user page on a social networking web site.

For example, when the request for content 206 is received, the content management system 110 can determine if the content publisher 109 of the web page 204 is a user in a social network. If so, then an identification of the content publisher 109 (e.g., using an anonymized ID) can be used to look up a social influence score for the content publisher 109 in the social influence scores 128. Using the determined social influence score for the content publisher 109, the content management system 110 can identify one or more offers in the stored offers 130 (e.g., including prices offered by content sponsors 108 of reservation content and bids by content sponsors 108 of performance-based ads). The offers, for example, can specify a minimum threshold social influence score for a given impression. If the content publisher 109 has a social influence score that meets or exceeds the minimum threshold social influence score, then the content management system 110 can provide the content item 202 (or at least further evaluate the content item) based at least in part on the identified offers.

The content management system 110 can include plural engines, including a social influence engine 122 that can determine social influence scores for users; a content sponsor engine 124 that can allow a content sponsor to target content to one or more users based at least in part on social influence scores (e.g., of content publishers 109); and a request handler 126 that can receive a request for content from a user, identify one or more offers associated with content sponsors that include a specification of at least a determined social influence score (e.g., for a given impression), and provide a content item responsive to the request and the at least one or more offers.

In a more detailed example, the social influence engine 122 can calculate a social influence score for each of a plurality of users associated with a social network. In some implementations, the social influence scores can be computed and updated on an ongoing basis, such as over time as users perform actions on the Internet that relate to social influence, including actions on social networking web sites. Moreover, the social influence score that is computed and updated for a particular user can also depend on the actions of other users, such as friends and family of the user who are related to the user through social networking web sites. In some implementations, the social influence score is defined on a per social network basis. That is, a user may have more than one social influence score, one for each social network in which the user participates. In some implementations, the social influence score can be computed over plural social networks (e.g., by aggregating scores over individual networks).

In some implementations in which a user's social influence score depends on the social influence scores of others (e.g., the user's friends on social networking sites), the social influence engine 122 can calculate the scores from the previously-calculated scores. In some implementations, the process can be repeated as needed, such as until the scores converge to a single value (e.g., do not change significantly between successive calculations).

In some implementations, calculating social influence scores can consider the age of the data used in making the calculations. For example, data corresponding to a user's actions within the last week or month can be considered to be a better indication of the user's social influence than the user's actions from two years ago. In some implementations, calculating social influence scores can disregard information older than a pre-determined threshold age (e.g., user postings or other actions that are over a year old).

Figure 2B:
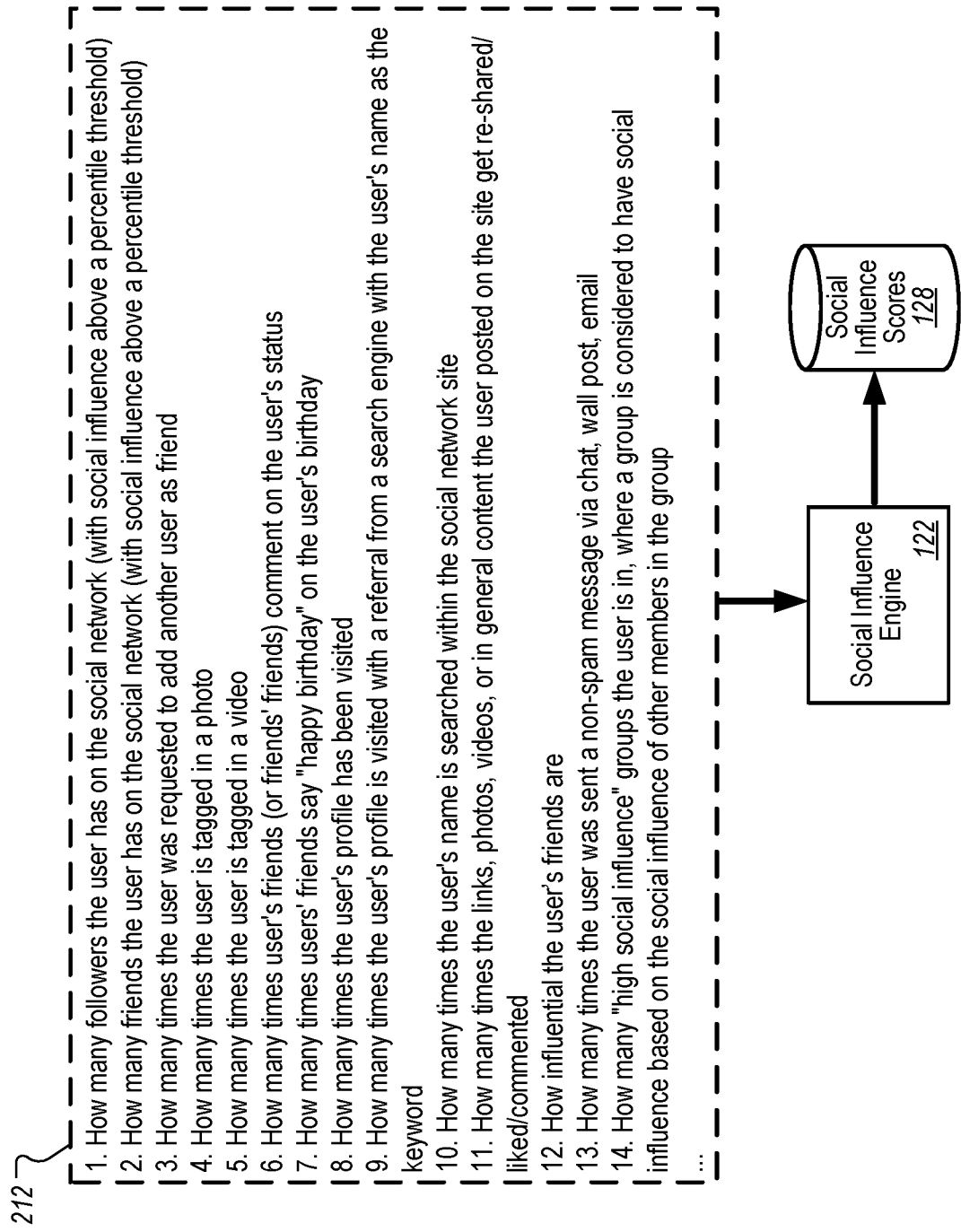
FIG. 2B is a block diagram showing example social metrics used for computing social influence scores.

As shown in FIG. 2B, some implementations can use social metrics 212 to determine social influence scores. For example, the social metrics 212 associated with a user can influence the way in which the social influence engine 122 calculates the social influence score for the user. In some implementations, weights can be assigned to each of the social metrics 212 to control the contribution of each social metric 212 to a user's social influence score. For example, higher weights can be assigned to the social metrics 212 corresponding to the numbers of a user's followers and/or friends than the number of video taggings that a particular user receives. Social influence scores can be used to determine whether content items are to be served, such as in response to requests for content on a page published by a content publisher 109 and further depending on the social influence score of the content publisher 109.

In some implementations, the different social metrics 212 can be categorized, (e.g., individually or in groups) into buckets, and social influence scores can be defined in terms of one or more buckets. In some implementations, receiving an offer from the content sponsor 108 can include the identification by the content sponsor 108 of one or more buckets as being attributable to a user for receipt of an impression of content from the content sponsor 108. For example, content sponsors 108 can use an additional user interface that includes separately-selectable checkboxes that correspond to the social metrics 212. For example, the content sponsor 108 can use the checkboxes to include or exclude individual social metrics 212 for use in determining social influence scores. As an example, a content sponsor 108 that sponsors a large amount of media-related content can use/select checkboxes that correspond to social metrics 212 relating to images (e.g., "How many times the content publisher is tagged in a photo") or video (e.g., "How many times the content publisher is tagged in a video").

As an example, the request handler 126 can receive a request for content 206 from the web page 204 published by the content publisher 109. The request for content 206 can be a request for a content item to fill the content item slot 210. The request handler 126 can determine the social influence score for the content publisher 109, e.g., by accessing the social influence scores 128. In some implementations, such as when the social influence scores in the social influence scores 128 are not up-to-date, the social influence engine 122 can calculate the social influence score for the content publisher 109 in real time, e.g., using metrics available from social networking web sites and applications.

For example, the social influence score for the content publisher 109 can be 75, e.g., based on calculations using the content publisher's social data that correspond to the social metrics 212. In some implementations, identification of users, including users who are also content publishers 109, can use anonymized IDs, e.g., to protect the privacy of users.

In response to the request for content 206, the request handler 126 can identify one or more offers associated with content sponsors that include a specification of at least a determined minimum social influence score for a given impression. More specifically, the request handler 126 can determine if any offers exist which have a minimum social influence score of 75 or less, i.e., so that the social influence score of the content publisher 109 associated with the requested content meets or exceeds the minimum social influence score stored for the offers.

The request handler 126 can provide the content items 202 responsive to the request and the at least one or more offers. For example, the one or more content items 202 that the request handler 126 provides can be based on social influence score-based offers provided by the content sponsors 108. The web page 204, for example, can receive the content items 202 to fill the content item slots 210.

In some implementations, the one or more content items 202 that are selected can be selected by conducting an auction. For example, the auction can use the one or more bids associated with the content sponsors 108 that specified a minimum social influence score of 75 or higher. As a result, the content item 202 that is provided can be based at least in part on the auction and the social influence information, as well as other information that can typically be used for selecting content items, e.g., including the relevance of content items to keywords, or criteria for selecting content to fulfill a content slot, to name a few examples.

Figure 2C:
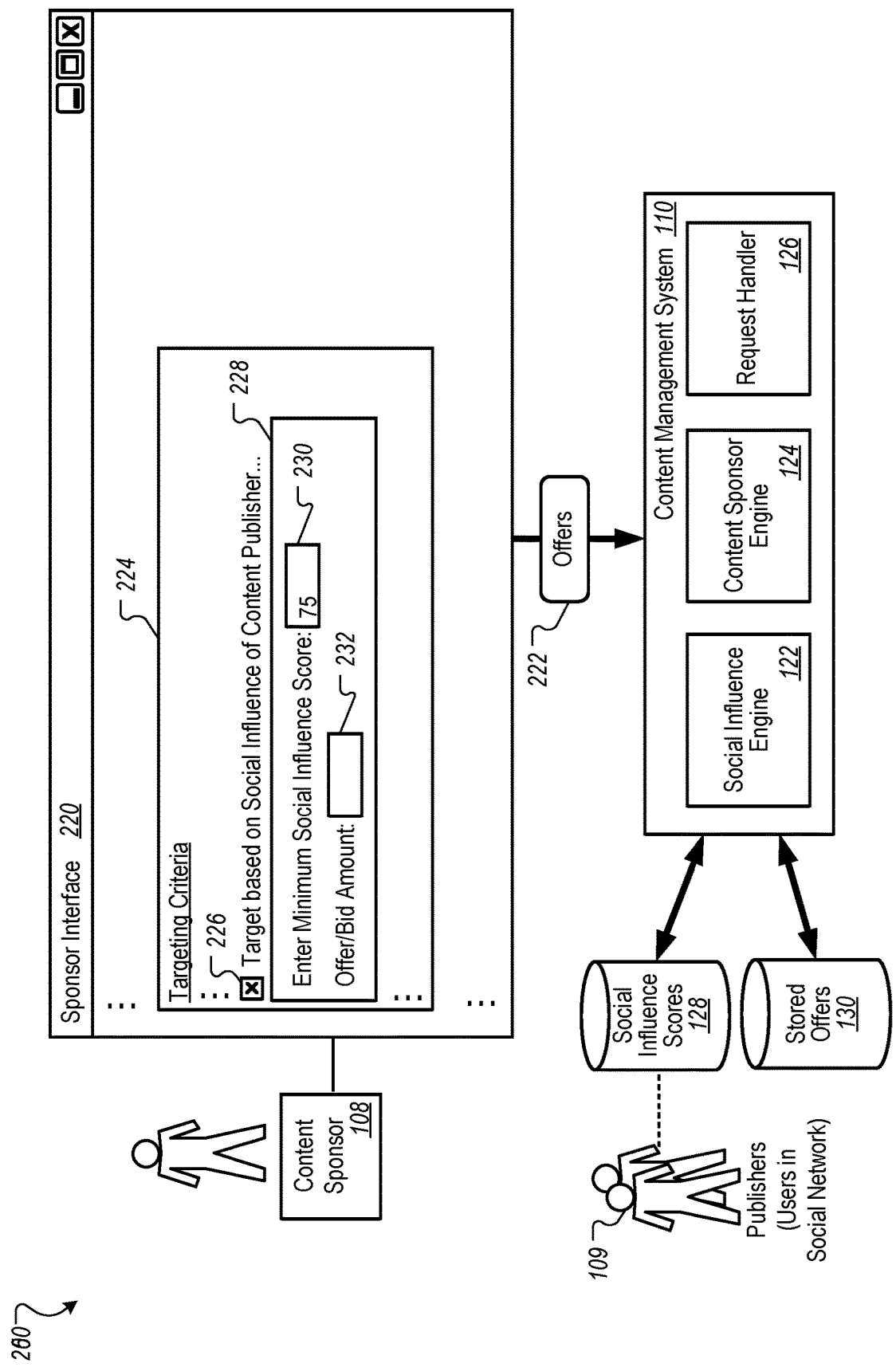
FIG. 2C is a block diagram of an example user interface for specifying offers for serving content items based on social influence scores of publishers.

FIG. 2C is a block diagram of an example user interface for specifying offers for serving content items based on social influence scores of content publishers 109. In some implementations, the content sponsor engine 124 can provide a sponsor interface 220 that content sponsors 108 can use to designate targeting criteria for targeting content to users, e.g., in a social network. For example, the sponsor interface 220 can allow a content sponsor 108 to designate, for each campaign, a minimum social influence score of content publishers 109. In this example, impressions of content in the campaign are not to be provided on a personal page of the content publisher 109 unless the content publisher 109 has a social influence score that meets or exceeds the minimum social influence score designated by the content sponsor 108.

For example, the content sponsor 108 can use the sponsor interface 220 to produce offers 222 that can be associated with an individual content item or a group of content items in a campaign. In some implementations, the sponsor interface 220 can include a targeting criteria area 224 that, along with other targeting controls and information, can include a checkbox 226 for enabling targeting based on social influence scores. In some implementations, if the content sponsor 108 checks the checkbox 226, then a social influence area 228 can be presented that includes a minimum social influence score 230 and an offer or bid amount 232. The content sponsor 108 can use the minimum social influence score 230, for example, to designate a minimum social influence score that is to be used as a threshold to determine whether impressions of content items in the campaign are to occur. As an example, the content sponsor 108 can enter 75 for the minimum social influence score 230 and $X for the offer or bid amount 232. As a result, the content sponsor 108 is effectively stating, for example, "I bid $X for 1000 impressions of content items in my campaign when the content item request is received from personal pages of content publishers 109 whose social influence score is at least 75." In some implementations, the offer or bid amount 232 can be the same as or different from other offers or bids in the sponsor interface 220. In some implementations, instead of using a field, the minimum social influence score 230 can be selected using a draggable bar.

Figure 3A:
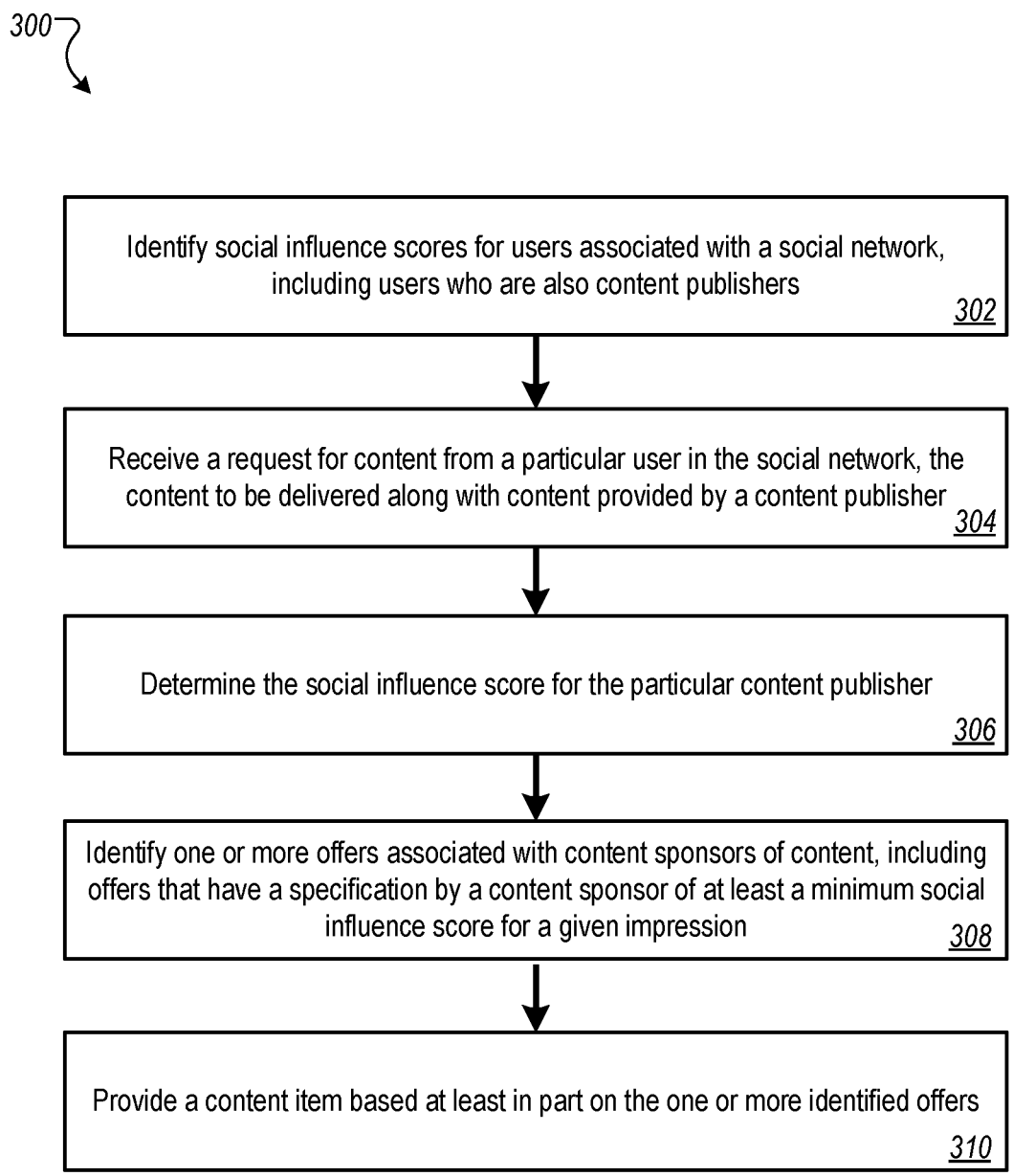
FIG. 3A is a flowchart of an example process for serving content based on social influence scores.

FIG. 3A is a flowchart of an example process 300 for serving content based on social influence scores. The process 300 can be performed by the content management system 110, for example, using the request handler 126 and the social influence engine 122. FIGS. 2A and 2B are used to provide examples for steps of the process 300.

A social influence score is identified for each of a plurality of users associated with a social network, where one or more of the users is also a publisher of content (302). For example, the social influence engine 122 can compute social influence scores for users using social metrics 212, and the social influence scores can be saved in the social influence scores 128. In the example of a user Jane who is also a publisher of content, the social influence engine 122 can compute Jane's social influence score 75, e.g., based on calculations using Jane's and other's social data corresponding to the social metrics 212.

A request for content is received (304). The content is to be delivered along with content provided by a content publisher. For example, the content management system 110 can receive the request for content 206 from the content publisher's (e.g., Jane's) web page 204 to fill the content item slot 210.

A social influence score is determined for the particular content publisher (306). For example, the social influence engine 122 can look up the social influence score for the content publisher Jane that has been pre-computed and stored in the social influence scores 128. In some implementations, if no social influence score is available for the content publisher, then the social influence engine 122 can compute the social influence score for the content publisher in real time. For example, to determine a score in real-time, the social influence engine 122 can access metrics available from one or more social networking web sites or groups to which the content publisher belongs. In the example of user Jane, the social influence engine 122 can look up Jane's social influence score of 75 from the social influence scores 128, or compute Jane's social influence score if the score is unavailable or is out-of-date.

One or more offers associated with content are identified (308). For example, the content management system 110 can identify stored offers 130 that are based at least in part on a specification by a content sponsor 108 of at least a minimum social influence score for a given impression. Each offer, for example, can enable the content sponsor to target one or more users based at least in part on content publishers' social influence in the social network. For example, the request handler 126 can access the stored offers 130 to identify offers responsive to the request for content 206 that also meet the social influence conditions associated with the request for content 206. Specifically, offers are identified for which the social influence score of the content publisher meets or exceeds the minimum social influence score for a given impression. In the example of user Jane, at least one of the offers identified can be an offer for impressions to personal pages of content publishers having a social influence score of 75 or greater.

A content item is provided that is based at least in part on the one or more identified offers (310). For example, the content management system 110 can provide the content item 202, e.g., a content item associated with a reservation to fill the content item slot 210. In this example, the content item that is provided can be based on other criteria for selecting content items in addition to offers based on social influence scores. For example, the other criteria can include keywords associated with the content item slot 210 (e.g., for search-related ads) or content item selection criteria used for reservation content items.

In some implementations, the content item that is provided can be based on conducting an auction. The auction can use the one or more bids associated with the content sponsors that each specified a minimum social influence score to be used for the given impression to the particular user associated with the request. Some bids can include no preference for social influence scores and can be evaluated along with the bids of content sponsors that specify minimum social influence scores.

Figure 3B:
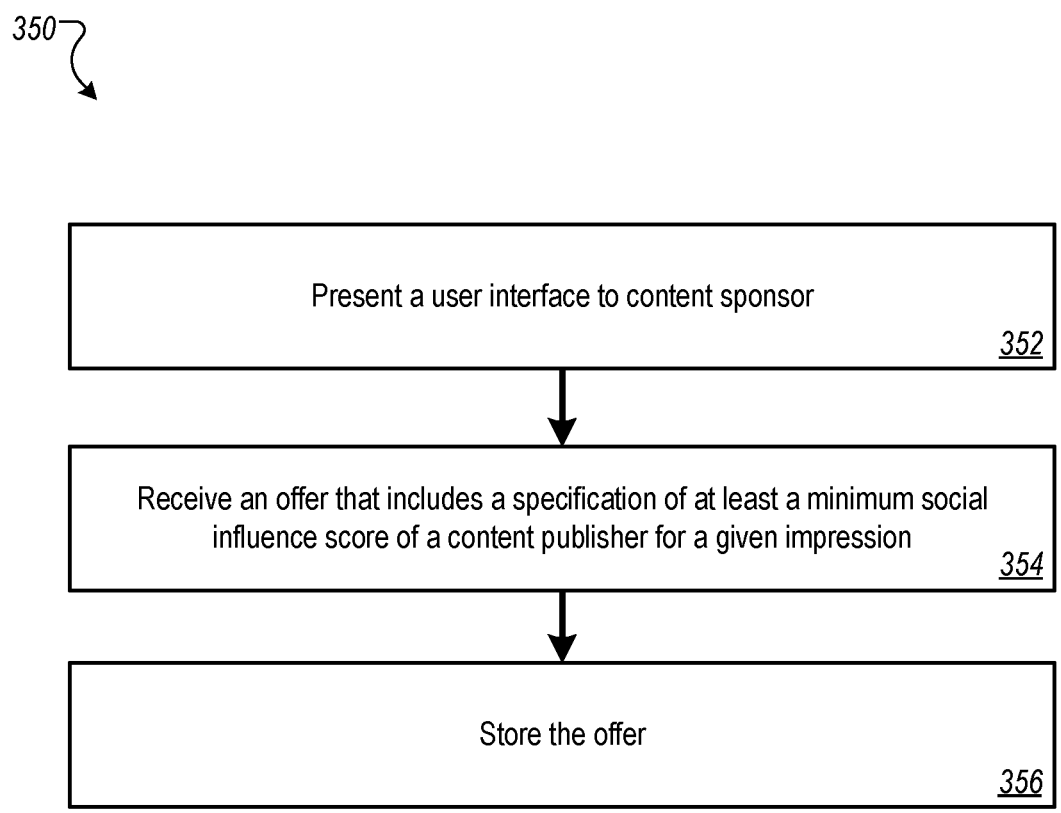
FIG. 3B is a flowchart of an example process for a content sponsor to provide offers based on social influence scores.

FIG. 3B is a flowchart of an example process 350 for a content sponsor to provide offers based on social influence scores. The content sponsor engine 124, for example, can perform at least some of steps of the process 350. FIG. 2C is used to provide examples for steps of the process 350.

A user interface is presented to a content sponsor (352). The user interface is used, for example, by a content sponsor to designate targeting criteria for targeting content based on social influence scores of users in a social network. For example, the content sponsor engine 124 can provide the sponsor interface 220 that can be used by the content sponsor 108. Using the sponsor interface 220, the content sponsor 108 can select the content item(s) (e.g., ads) or campaigns on which to make offers.

An offer is received from the content sponsor including an offer amount and a specification of a minimum social influence score of a content publisher for a given impression (354). For example, as described above, the content sponsor 108 can provide a minimum social influence score 230 that designates the minimum social influence score that is to be used as a threshold to determine whether impressions of content items in the campaign are to occur. As an example, the content sponsor 108 can enter 75 for the minimum social influence score 230 and $X for the offer or bid amount 232.

The offer is provided for storage (356). For example, the content sponsor engine 124 can store the offer in the stored offers 130 for later use in selecting content items for impressions based at least on social influences and other factors.

In some implementations, content can be targeted to users based on their influence scores using a method with the following steps. A request for content is received from a user who is a participant in a social network, and the request is associated with a content request for receipt of content from a content publisher. As an example, the content management system 110 can receive the request for content 206 from the content publisher's web page 204 to fill a content item slot.

An influence score associated with the content publisher in the social network is determined. For example, the social influence engine 122 can look up the social influence score for content publisher 109 that has been pre-computed and stored in the social influence scores 128.

Content is targeted to the user based at least in part on the content publisher's influence score in the social network. Targeting includes enabling content sponsors to bid on impressions of content to users that satisfy a predetermined influence score criteria. For example, the content item targeted to the user 208 can be the content item 202 that is selected based on the social influence score of the content publisher 109. The content item 202 can be selected at least in part, for example, because it is associated with an offer by a content sponsor to target content to users based on predetermined minimum social influence scores of content publishers.

In some implementations, content can be provided to users using an auction of bids based on minimum influence scores using a method with the following steps. A request is received for content from a user in a social network for delivering one or more content items along with content presented by a content publisher. For example, the content management system 110 can receive the request for content 206 from the content publisher's web page 204 to fill a content item slot.

An influence score associated with the content publisher is determined. As an example, the social influence engine 122 can look up the social influence score for the content publisher 109, e.g., from the social influence scores 128.

An auction is conducted based on bids received from content sponsors including bids identifying a minimum influence score for a targeted content publisher for which content is eligible to be presented. For example, the auction can use the one or more bids associated with the content sponsors that each specified a minimum social influence score to be used for the given impression to the particular content publisher associated with the request.

At least one winning bid is identified, and one or more content items are provided to the user based at least in part on auction results and the content publisher's influence score. For example, the content management system 110 can provide the content item 202 to fill a content item slot on the content publisher's web page 204.

Figure 4:
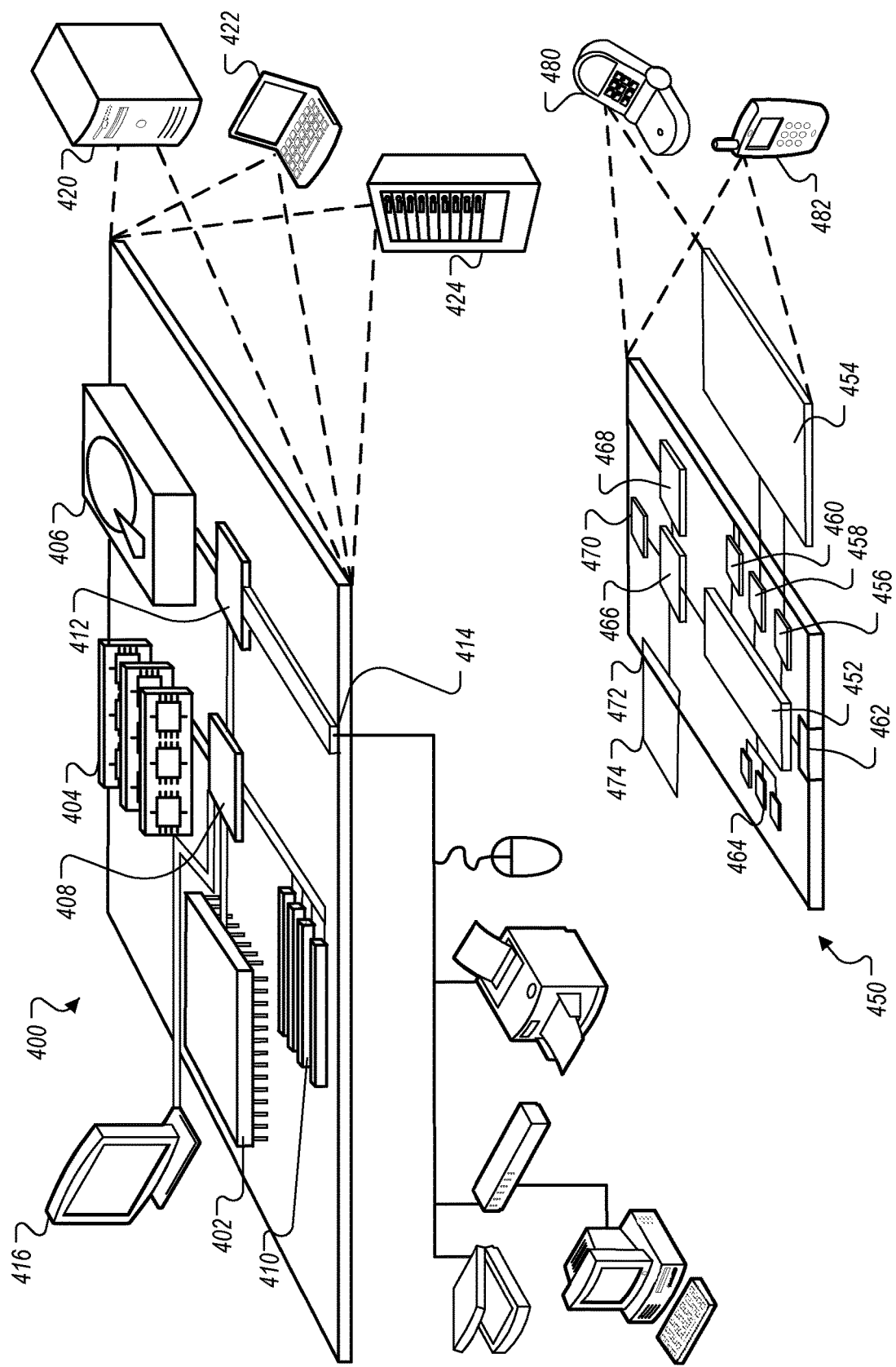
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    generating, by a content management system, an electronic user interface that presents separately selectable controls that each modify types of user interactions that are used to compute a dynamically customized social influence score that is assigned to each particular social network user among a plurality of users of a social network when interaction with the controls occurs, wherein the types of interactions that are modified by interaction with the separately selectable controls include at least a number of friends of the particular social network user on the social network that have a social influence score above a percentile threshold;
    modifying the set of criteria used to compute the dynamically customized social influence score to include the types of interactions specified by the content sponsor through interaction with the separately selectable controls;
    determining, by the content management system, a dynamically customized social influence score for one or more users from the plurality of users of the social network using the types of interactions included in the modified set of criteria; and
    distributing, by the content management system, content to the one or more users from the plurality of users of the social network based on the dynamically customized social influence score for each of the one or more users of the plurality of users of the social network determined using the modified set of criteria.

2. The method of claim 1, wherein the dynamically customized social influence score is measured in terms of one or more social signals that relate to categories of user activity of the particular social network user or set of users in the social network.

3. The method of claim 2, wherein one or more aggregation functions are used to compute the dynamically customized social influence score from multiple social signals.

4. The method of claim 1, wherein the modified set of criteria comprises a threshold target social influence score for the one or more users of the plurality of users to receive content.

5. The method of claim 1, wherein the content sponsor further specifies, through interaction with the separately selectable controls, one or more particular social networks for which the content is to be provided.

6. The method of claim 1, further comprising:
    receiving a request for content from a user, the user being a participant in the social network, the request being associated with a content request for receipt of content from a content publisher;
    determining the dynamically customized social influence score for the content publisher using the types of interactions included in the modified set of criteria; and
    providing content to the user based on the dynamically customized social influence score for the content publisher.

7. The method claim 6, wherein the request for content is a request for content to be delivered in the social network.

8. The method of claim 6, wherein the request for content is a request for content to be delivered outside the social network.

9. The method of claim 1, wherein the dynamically customized social influence score for one or more users from the plurality of users of the social network is calculated using one or more action metrics of friend requests, photo associations, video associations, cross-user commenting, birthday greetings, viewings, referrals, user-name searches, re-publishings, or unspamminess.

10. A content management system that provides content items responsive to received requests, the content management system including:
    a social influence engine enabled to determine customizable social influence scores for particular publishers of content;
    a content sponsor engine that enables a content sponsor to modify a set of criteria used to generate a dynamically customizable social influence score that is used to distribute content of the content sponsor to users of a social network by performing operations including:
        generating an electronic user interface that presents separately selectable controls that each modify types of user interactions that are used to compute a dynamically customized social influence score that is assigned to each particular social network user among a plurality of users of a social network when interaction with the controls occurs, wherein the types of interactions that are modified by interaction with the separately selectable controls include at least a number of friends of the particular social network user on the social network that have a social influence score above a percentile threshold;

modifying the set of criteria used to compute the dynamically customized social influence score to include the types of interactions specified by the content sponsor through interaction with the separately selectable controls;

determining a dynamically customized social influence score for one or more users from the plurality of users of the social network using the types of interactions included in the modified set of criteria; and distributing content to the one or more users from the plurality of users of the social network based on the dynamically customized social influence score for each of the one or more users of the plurality of users of the social network determined using the modified set of criteria.

11. The system of claim 10, wherein the dynamically customized social influence score is measured in terms of one or more social signals that relate to categories of user activity of the particular social network user or set of users in the social network.

12. The system of claim 10, wherein one or more aggregation functions are used to compute the dynamically customized social influence score from multiple social signals.

13. The system of claim 10, wherein the modified set of criteria comprises a threshold target social influence score for the one or more users of the plurality of users to receive content.

14. The system of claim 10, wherein the content sponsor further specifies, through interaction with the separately selectable controls, one or more particular social networks for which the content is to be provided.

15. The system of claim 10, further comprising:

receiving a request for content from a user, the user being a participant in the social network, the request being associated with a content request for receipt of content from a content publisher;

determining the dynamically customized social influence score for the content publisher using the types of interactions included in the modified set of criteria; and providing content to the user based on the dynamically customized social influence score for the content publisher.

16. The system of claim 15, wherein the request for content is a request for content to be delivered in the social network.

17. The system of claim 15, wherein the request for content is a request for content to be delivered outside the social network.

18. The system of claim 10, wherein the dynamically customized social influence score for one or more users from the plurality of users of the social network is calculated using one or more action metrics of friend requests, photo associations, video associations, cross-user commenting, birthday greetings, viewings, referrals, user-name searches, re-publishings, or unspamminess.

19. A computer program product tangibly embodied in a computer-readable storage device and comprising instructions that, when executed by a processor, cause the processor to:

generate an electronic user interface that presents separately selectable controls that each modify types of user interactions that are used to compute a dynamically customized social influence score that is assigned to each particular social network user among a plurality of users of a social network when interaction with the controls occurs, wherein the types of interactions that are modified by interaction with the separately selectable controls include at least a number of friends of the particular social network user on the social network that have a social influence score above a percentile threshold;

modify the set of criteria used to compute the dynamically customized social influence score to include the types of interactions specified by the content sponsor through interaction with the separately selectable controls;

determine a dynamically customized social influence score for one or more users from the plurality of users of the social network using the types of interactions included in the modified set of criteria; and distribute content to the one or more users from the plurality of users of the social network based on the dynamically customized social influence score for each of the one or more users of the plurality of users of the social network determined using the modified set of criteria.

20. The storage device of claim 19, wherein the dynamically customized social influence score is measured in terms of one or more social signals that relate to categories of user activity of the particular social network user or set of users in the social network.

* * * * *